(12) United States Patent
Weaver

(10) Patent No.: US 10,930,452 B2
(45) Date of Patent: Feb. 23, 2021

(54) ELECTRONIC KILL AND PHYSICAL COVER SWITCH

(71) Applicant: Purism, South San Francisco, CA (US)

(72) Inventor: Todd Weaver, South San Francisco, CA (US)

(73) Assignee: Purism, South San Francisco, CA (US)

( * ) Notice: Subject to any disclaimer, the term of this patent is extended or adjusted under 35 U.S.C. 154(b) by 0 days.

(21) Appl. No.: 16/457,328

(22) Filed: Jun. 28, 2019

(65) Prior Publication Data

US 2020/0020493 A1 Jan. 16, 2020

Related U.S. Application Data

(60) Provisional application No. 62/691,822, filed on Jun. 29, 2018.

(51) Int. Cl.
*H01H 15/10* (2006.01)
*H04N 5/232* (2006.01)
*H04N 5/225* (2006.01)
*G06F 1/16* (2006.01)

(52) U.S. Cl.
CPC .......... *H01H 15/10* (2013.01); *G06F 1/1616* (2013.01); *H04N 5/2257* (2013.01); *H04N 5/232* (2013.01); *H01H 2231/002* (2013.01); *H01H 2231/022* (2013.01); *H01H 2231/046* (2013.01)

(58) Field of Classification Search
CPC ............. H01H 15/10; H01H 2231/022; H01H 2231/046; H01H 2231/002; H04N 5/232; H04N 5/2257; H04N 5/232941; H04N 5/232411; H04N 5/2252; G06F 1/1616; G06F 1/1626; G06F 1/1686
See application file for complete search history.

(56) References Cited

U.S. PATENT DOCUMENTS

| 3,703,987 | A | 11/1972 | Ikeda |
| 4,945,443 | A | 7/1990 | DeBiasi et al. |
| 5,402,465 | A | 3/1995 | Foltz |
| 5,555,156 | A | 9/1996 | Decante |
| 5,787,307 | A | 7/1998 | Imoto |
| 6,233,464 | B1 | 5/2001 | Chmaytelli |
| 7,024,700 | B1 | 4/2006 | Horikoshi et al. |

(Continued)

FOREIGN PATENT DOCUMENTS

| CN | 100438603 | 6/2005 |
| DE | 102008022655 | 8/2018 |

(Continued)

OTHER PUBLICATIONS

International Search Report in International Appln. No. PCT/US2019/39926, dated Nov. 20, 2019, 10 pages.

(Continued)

*Primary Examiner* — Timothy J Henn
(74) *Attorney, Agent, or Firm* — Fish & Richardson P.C.

(57) ABSTRACT

A system includes a frame and a camera coupled to the frame. The camera includes a switch having an on position and an off position. The switch coupled to the frame wherein when the switch is in an off position a portion of the switch covers the lens and the camera is disable and when the switch is in an on position the portion of switch does not cover the lens and the camera is enabled.

22 Claims, 7 Drawing Sheets

(56) References Cited

U.S. PATENT DOCUMENTS

| | | | |
|---|---|---|---|
| 7,031,758 | B2 | 4/2006 | Chang |
| 7,111,176 | B1 | 9/2006 | Ellison et al. |
| 7,581,893 | B2 | 9/2009 | Miramontes |
| 7,992,024 | B2 | 8/2011 | Islam et al. |
| 8,090,961 | B2 | 1/2012 | Yoffe et al. |
| 8,522,309 | B2 | 8/2013 | Yoffe et al. |
| 8,896,754 | B2 † | 11/2014 | Mundt |
| 8,924,708 | B2 | 12/2014 | Yoffe et al. |
| 9,871,974 | B2 † | 1/2018 | Robinson |
| 2003/0051162 | A1 | 3/2003 | Kirchmann |
| 2003/0062252 | A1 | 4/2003 | Fonseca |
| 2004/0198307 | A1 | 10/2004 | Chang |
| 2004/0203536 | A1 | 10/2004 | Chao et al. |
| 2004/0243825 | A1 | 12/2004 | Hunt |
| 2005/0009496 | A1 | 1/2005 | Chen |
| 2005/0213961 | A1* | 9/2005 | Kobayashi ............ G03B 17/02 396/448 |
| 2005/0271190 | A1 | 12/2005 | Linkenhoger |
| 2006/0062252 | A1 | 3/2006 | Jung et al. |
| 2006/0248257 | A1 | 11/2006 | Kojima |
| 2007/0242948 | A1* | 10/2007 | Miramontes ........ H04M 1/0264 396/448 |
| 2008/0178282 | A1 | 7/2008 | Yoffe et al. |
| 2008/0215841 | A1 | 9/2008 | Bolotin et al. |
| 2011/0131639 | A1 | 1/2011 | Buhler et al. |
| 2011/0058255 | A1* | 3/2011 | Weiss ................. H04M 1/0264 359/511 |
| 2011/0179482 | A1* | 7/2011 | Yoffe ..................... G06F 21/82 726/17 |
| 2013/0222609 | A1* | 8/2013 | Soffer ................. H04N 5/2252 348/207.1 |
| 2013/0340069 | A1 | 12/2013 | Yoffe et al. |
| 2014/0023346 | A1* | 1/2014 | Bar-On .................. H04N 9/80 386/252 |
| 2014/0028777 | A1 | 1/2014 | Koberling |
| 2015/0082422 | A1 | 3/2015 | Yoffe et al. |
| 2015/0248566 | A1* | 9/2015 | Scott-Nash ......... G06F 21/6245 726/26 |
| 2015/0288882 | A1* | 10/2015 | Haddad ................ H04N 5/2258 348/211.2 |
| 2016/0072768 | A1* | 3/2016 | Ibsies .................... H04W 12/08 726/3 |
| 2017/0263254 | A1* | 9/2017 | Dewan .................... G10L 15/28 |
| 2018/0165472 | A1* | 6/2018 | Adams .................... G06F 21/83 |
| 2019/0278949 | A1* | 9/2019 | Wu ....................... H04W 12/12 |
| 2020/0112587 | A1* | 4/2020 | Jakubowski ........ H04L 63/1466 |

FOREIGN PATENT DOCUMENTS

| | | |
|---|---|---|
| EP | 1698990 | 2/2006 |
| EP | 2106578 | 10/2009 |
| GB | 2279478 | 8/1993 |
| JP | 11-110505 A | 4/1999 |
| JP | 2005-236605 | 9/2005 |
| WO | WO 00/63778 | 10/2000 |
| WO | WO 2008/090537 | 7/2008 |
| WO | WO 2008/140292 | 11/2008 |

OTHER PUBLICATIONS

Todoric, Z. "Hard, Not Soft, Kill Switches," PURISM. Blog Post. Sep. 23, 2015. [Retrieved from the internet on Sep. 28, 2019]. <URL: https://puri.sm/posts/hard-not-soft-1<ill-switches/>.

Islam et al., "Next Generation Intel.RTM. ATOM.TM. Processor Based Ultra Low Power SoC for Handheld Applications," IEEE Asian Solid-State Circuits Conference, Nov. 8-10, 2010, Beijing, China, 4 pages.

\* cited by examiner

† cited by third party

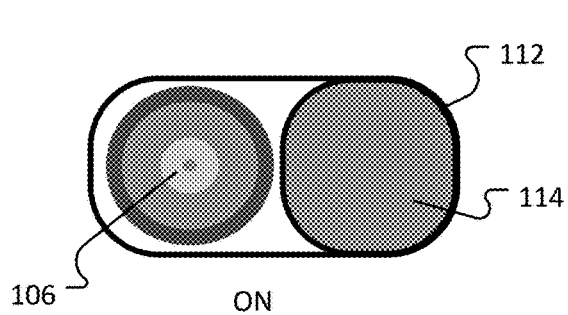
FIG. 2A ON
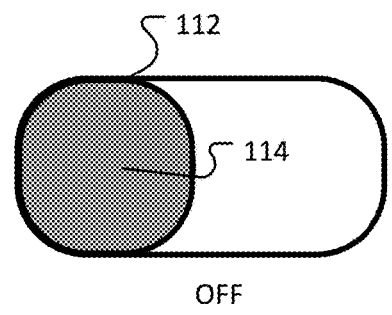
FIG. 2B OFF
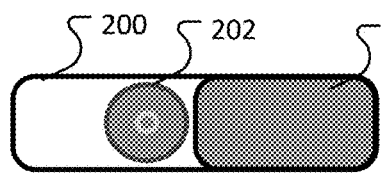
FIG. 2C ON
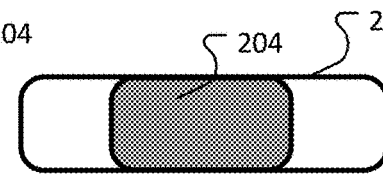
FIG. 2D PARTIAL ON
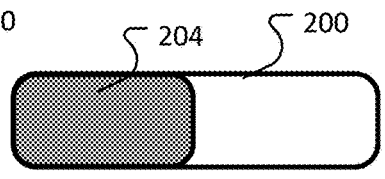
FIG. 2E OFF
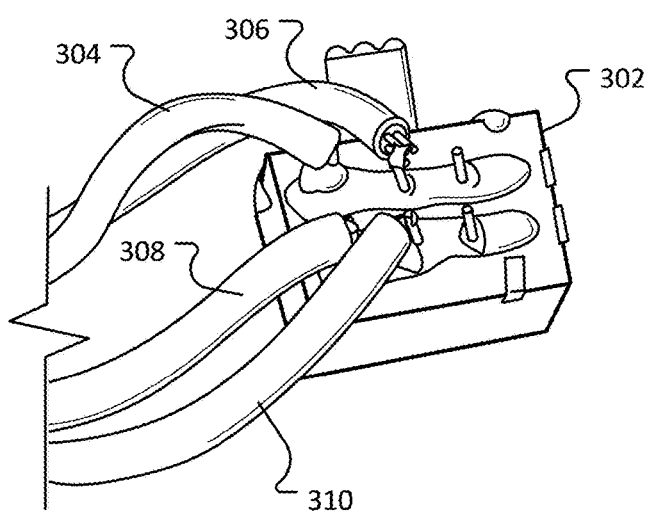
FIG. 3

ELECTRONIC KILL AND PHYSICAL COVER SWITCH

CLAIM OF PRIORITY

This application claims priority to U.S. Patent Application Ser. No. 62/691,822, filed on Jun. 29, 2018, the entire contents of which are hereby incorporated by reference.

BACKGROUND

Computer security, also known as cyber security or IT security, is the protection of computer systems from the theft or damage to their hardware, software or information, as well as from disruption or misdirection of the services they provide.

SUMMARY

The incorporation of a switch into a computer device, where the switch selectively deactivates select components in the computer device can provide several advantages over other computer devices. For example, the switch can disconnect or disable components which may otherwise be used to invade a user's privacy (for example, a camera, microphone, GPS system, etc.), the switch can cover at least one of the of disabled components when the switch is in the off position providing both an easy mechanism to know whether the switch is in the on or off position, the switch can sever a physical connection between the component and the computing system making the component inaccessible to the computing system.

In general, innovative aspects of the subject matter described in this specification can be embodied in systems that include a frame. The systems include a camera coupled to the frame, the camera comprising a lens. The systems also include a switch having an on position and an off position, the switch coupled to the frame where when the switch is in an off position a portion of the switch covers the lens and the camera is disabled and when the switch is in an on position the portion of switch does not cover the lens and the camera is enabled.

Implementations can optionally include one or more of the following features: The system of may include a power source, where when the switch is in the off position the camera is disconnected from the power source. The system may include a microphone, where when the switch is in the off position the microphone is disabled and when the switch is in the on position the microphone is enabled. The system may include a hardware based management processor, where when the switch is in the off position the hardware-based management processor is disabled and when the switch is in the on position the hardware-based management processor is enabled. The system may be a smart phone. The system may include a second switch and a microphone, wherein when the switch is in the off position the microphone is disabled and when the switch is in the on position the microphone is enabled. The system may be a laptop computer. The system may include a processor and a memory storing a default application associated with the camera, where the processor is configured to launch the default application in response to the switch being moved from the off position to the on position.

In some implementations, the system can include an indicator, where the indicator is connected to a power source of the camera, and where the indicator configured to emit a signal when the camera is enabled and where the indicator is configured to be disabled when the camera is disabled.

In some implementations, the system includes a processing device and a memory in communication with the processing device. The memory can be configured to store data that is generated by the camera or another sensor. Generally, the switch is configured to cause the processing device to quarantine the data that is generated by the camera or the other in the memory when a position of the switch is changed. In some implementations, the switch is configured to cause the processing device to delete the data that is generated by the camera or the other sensor in the memory when a position of the switch is changed. In some implementations, the processing device is configured to execute at least one application associated with the camera. In response to detecting a change in a position of the switch, the processing device is configured to generate a notification that identifies the at least one application when the application is active. In some implementations, in response to detecting a change in a position of the switch, the processing device is configured to generate a notification that halts execution of the at least one application.

In some implementations, the system includes a transmitter configured to send data to a remote computing device. The switch is configured to temporarily disable the transmitter when the switch is moved to the off position.

In an aspect, a process for providing a physical security measure for a computing system includes, determining, by a processing device of the computing system, that a hardware switch is moved to a position configured to disable a sensor of the computing system. The process includes testing, by the processing device, the sensor to verify that the sensor is disabled. The process includes generating a notification for presentation on a user interface, the notification indicating that the sensor is disabled.

In some implementations, the actions include identifying, in response to determining that the hardware switch is moved to the position, at least one application configured to receive data associated with the sensor. The process includes updating the notification to identify the at least one application configured to receive data from the sensor when the application is active at a time when the hardware switch is moved. The process includes determining that data is generated by the sensor during a time window, the time window having a pre-determined length. The process includes causing the data generated by the sensor during the time window to be deleted in response to determining that the hardware switch is moved to the position.

In some implementations, the process includes deactivating a second, different sensor in response to determining that the hardware switch is moved. The sensor can include one of a camera, a microphone, and a transmitter. In some implementations, the process includes causing a hardware-based management processor to be disabled in response to determining that the hardware switch is moved to the position.

Other implementations of any of the above aspects include corresponding methods, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIG. 2A-E illustrates example switches.

FIG. 3 illustrates an example of connecting double pole double throw switch to a camera and microphone.

DETAILED DESCRIPTION

The advent of computer technology has led to dramatic advancements in productivity. Computer devices from desktop computers, laptops, tablets, smart phones, and other similar devices enable a relatively high degree of connectivity for various users. However, computer devices provide a risk that the privacy of users is violated. Computer device vulnerabilities can be exploited to give access to a user's device. For example, vulnerabilities can enable access to the camera and microphone, allowing a computer device to act as an electronic surveillance device. The location of a computer device can be tracked by accessing Global Positioning Services (GPS) and location based services.

A computer system can be equipped with switches that disable components, such as sensors that can be used to invade the user's privacy by gathering data without the knowledge of the user. These components can be disabled at the hardware level, for example, by breaking a connection that sends a signal to or from the component, by disconnecting power to the component, or through another hardware disabling mechanism. Because the switches may not be dependent on software to disable the component, the switches cannot be hacked or exploited remotely. Generally, a component (or sensor) that is disabled is unable to collect additional data as the sensor is intended. For example, a disabled camera can be unable to generate any data, can generate obfuscated data (e.g., generate data representing black images because of a cover), or otherwise be prevented from nominal operation. An enabled or active sensor is configured to sense the environment around the computing system and generate data representing an aspect the environment without being blocked, blurred, scrambled, or otherwise altered.

Figure 1:
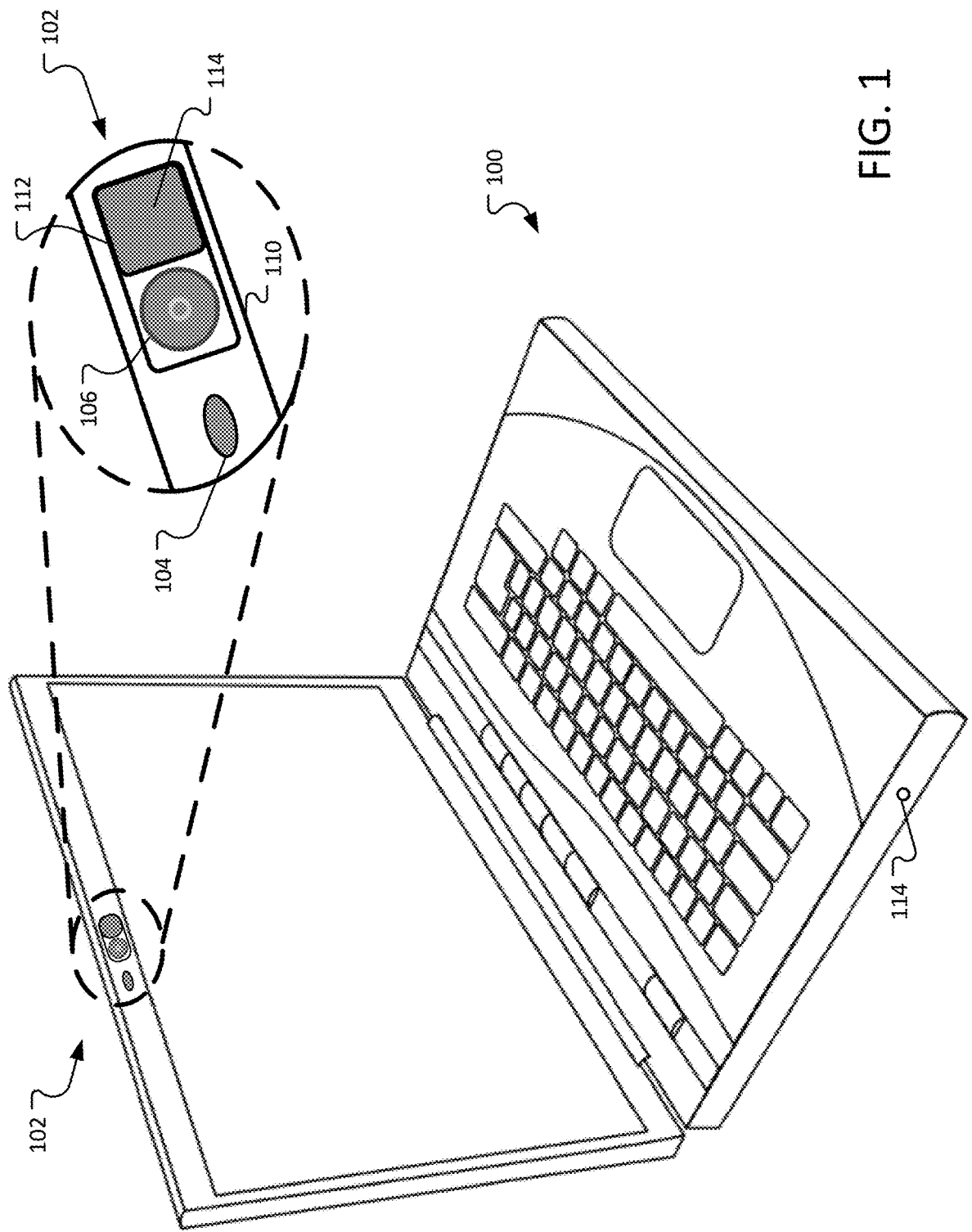
FIG. 1 illustrates a laptop computer with enhanced security.

FIG. 1 illustrates a computing system 100 (e.g., a laptop computer) with enhanced security. The computing system 100 includes a camera 106 and a microphone 104 (shown in the magnified area 102). The camera is set into a frame 110 of the computing system 100. The laptop computer 100 includes a switch 112 attached to the frame 110. As shown in FIG. 2A-2B, the switch is located near the camera 106 so that movement of the moveable portion 114 of the switch 112 from an on position (illustrated in FIG. 2A) to an off position (illustrated in FIG. 2B) causes the moveable portion 114 of the switch 112 to cover the camera 106.

In some implementations, when the switch is moved to the on position, the laptop computer 100 can recognize that a component has been enabled and can launch a default application associated with the component. For example, a chat application, a camera application, a video conference application, etc. In some implementations, a user of the laptop (or other device) may be able to customize and select which application(s) launches. In some implementations, multiple applications may be configured to launch.

In some implementations, the switch may be a double throw switch. FIG. 2C-2E illustrate an example of employing a double throw switch 200. The double throw switch 200 includes three positions, an off position, a partial-on position, and an on position. In this example, the moveable portion 204 of the double throw switch 200 is sufficiently wide to cover the camera 202 in the off position (as illustrated by FIG. 2E), and in the partial-on position (as illustrated in FIG. 2D). The moveable portion of the double throw switch reveals the camera 202 in the second on position (illustrated by FIG. 2C). The double throw switch 200 may be used, for example, to disable the camera 202 and a microphone (not shown) when in the off position, to disable the camera 202 and enable the microphone when in the partial-on position, and to enable the camera 202 and the microphone when in the on position. In general, a double throw switch can be used to control two different components. Other types of switches may also be used, for example, a single pole single throw switch, a single pole double throw switch, a double pole single throw switch, etc.

In some implementations, the double throw switch is configured to sever a power connection to each of the microphone and the camera 202 to disable the microphone and the camera, in addition to physically covering the camera. In some implementations, the double throw switch 200 can be connected to a hardware indicator that displays a status of the sensors (such as the camera 202, the microphone, or another sensor) that is controlled by the double throw switch. For example, the indicator can include a light emitting diode (LED), which is configured to illuminate when the double throw switch is disabling a sensor (or vice versa). For example, an LED can be configured to illuminate a first color when the microphone is disabled, and illuminate a second color when both the camera and the microphone are disabled. The indicator can provide a second check to the user to show that an associated sensor is disabled. In some implementations, the indicator is positioned on a hardware circuit in communication with the sensor. A hardware connection to the indicator can ensure that the indicator accurately represents the status of a sensor associated with the indicator and that the indicator hasn't been compromised by an unauthorized user. For example, the indicator can be configured to be in sequence with a power signal provided to the sensor so that the indicator is on when the sensor is receiving power and off when the sensor is not receiving power. In some implementations, the illuminator can be positioned in sequence with an inverter so that, when the sensor is inactive, the indicator is active (e.g., illuminated).

Referring back to FIG. 1, movement of the switch from the on position to the off position can further disable the camera. The switch 112 can also disable additional components on the laptop computer, for example, the switch may disable the microphone 104, the microphone jack 114, etc.

Disabling components of a computing system can include disconnecting the components from a power source for the respective components, disconnecting the signal path between the component and computing system, disabling a processing chip that controls the component, etc. For example, the switch 112 can be configured to physically sever the respective connection from the sensor to a power source, to the computing system, and so forth. Generally, the switch 112 is configured to control operation of a sensor independent a software signal.

FIG. 3 illustrates an example of connecting camera and microphone power to a double pole double throw switch. The wires 304, 306 to power the camera are connected to one set of terminals on the switch 302. In this example, the microphone is a passive device that does not require power to be operational, the wires 308, 310 that deliver the signal for the microphone are connected to another set of terminals on the switch 302. In this manner, moving the switch 302 to the off position causes the power to the camera and the signal from the microphone to be disconnected.

In some implementations, when the switch moves to a position that causes the power to the camera to be disconnected, the system may terminate any processes or applications that are currently accessing the camera. For example, the switch may be configured to send a signal to a processor of the computing system, or may be otherwise in communication of integrated with the computing system. The signal may cause the processor of the computing system to identify and end any processes or applications that are accessing the camera.

In some implementations, the processor can also be configured to disable a different hardware device (other than the respective sensor, such as the camera or microphone) in response to activation of the switch. For example, a network connection between the computing system and another computing system (e.g. a remote computing system) can be severed so that data captured by the sensor cannot be transmitted to the remote device. For example, the switch 112 can be configured to sever an internet connection of the computing system 100 or cause the computing system 100 to restrict data transmission while the switch is activated.

The switch 112 can be configured to cause the computing system 100 to perform some other action in response to activation of the switch. The other action can be an action in software. For example, the computing system 100 can be configured to clear a memory cache associated with the sensor (e.g., the camera 106, microphone 104, or another sensor). This can prevent data that was already captured by the sensor (e.g., prior to deactivation by the switch 112) from being retrieved at a later time by an unauthorized user. In some implementations, a notification can be presented to a user indicating one or more applications that are retrieving data from the sensors when the sensors are deactivated. For example, if a memory associated with a webcam application is storing data from the camera 106 when the camera is deactivated by the switch 112, a notification can be displayed to the user of the computing system 100 indicating that the webcam application collected image data from the camera 106. The user is informed about the data collection and can decide whether to save the image data or discard the image data. In another example, the data captured by the sensor that is controlled by the switch 112 can be quarantined to a particular location in memory of the computing system. In some implementations, the data that is deleted, quarantined, etc. in the cache related to the sensor can be data that was collected during a particular time window (such as the last 5 minutes, 10 minutes, 30 seconds, etc.). The time window can be set by a user in an application related to the switch 112.

Figure 4:
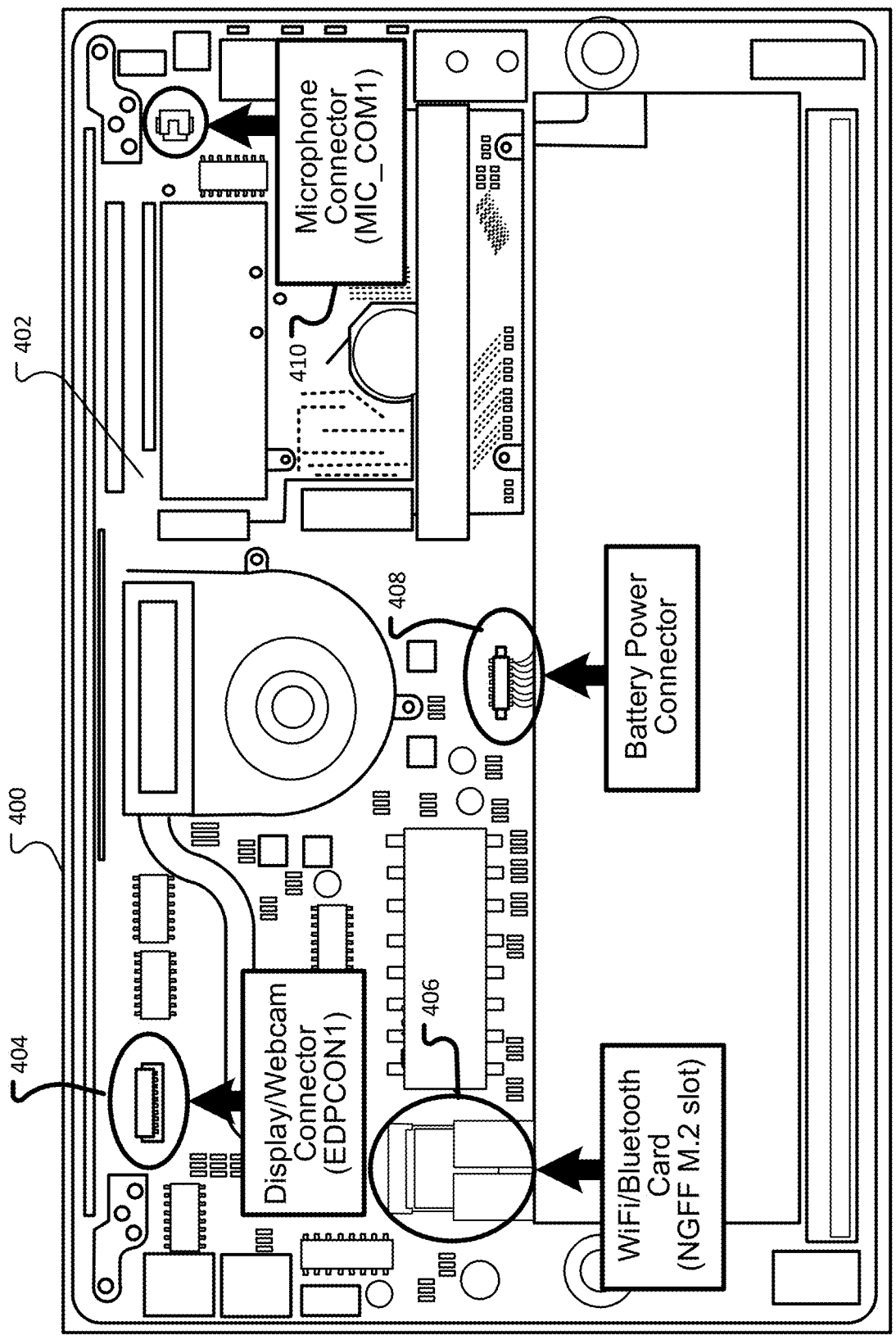
FIG. 4 illustrates locations on an example motherboard for a laptop where the switches may be connected between a power source and components.

FIG. 4 illustrates locations on an example of a circuit board (for example, a motherboard) for a laptop where the switches may be connected between a power source and components. In this example, the camera on the laptop 400 is located above the laptop's screen (not shown) and connects to the motherboard 402 via connector 404 (for example, an EDPCON1 connector which is a 30 pin connector that also contains all the wiring for the laptop's display). The camera uses a USB 2.0 interface, meaning there are four wires on connector 404 that are used just for the camera. Two of the four wires are for data, one is for a +3.3 volt DC signal to power the camera, and the last wire it the ground. To disable the camera with a switch, the wire providing the +3.3 volt DC signal can be wired directly into the switch.

With the switch in the OFF position, no power gets to the camera, and thus making it impossible for the camera to be used (in this example, the camera is not detected by a kernel nor operating system of the laptop when the switch is in the off position).

In some implementations, the microphone on a laptop can be located right next to the camera above the laptop's screen (as described above with respect to FIG. 1) and connects to the laptop's motherboard via connector 410 (for example, a MIC_COM1 connector). But unlike the camera, the microphone is a passive device that has two wires, a signal wire and a ground wire. The signal wire transmits the signal from the microphone to the mother board. The ground wire is used to ground the microphone. The signal wire can be connected to a switch, as described above, with respect to FIG. 3.

With the switch in the OFF position, no signal from the microphone is provided to the motherboard, thus making it impossible for the microphone to send any signals to the laptop. By wiring both the camera and the microphone into the same switch, both devices can be disabled simultaneously.

Other components of the computing system can also be disabled using a switch, these components can include components that enable, Bluetooth, WiFi, Global Positioning System (GPS) devices, location based services, MAC Addresses, 3G services, etc.

Figures 5, 6:
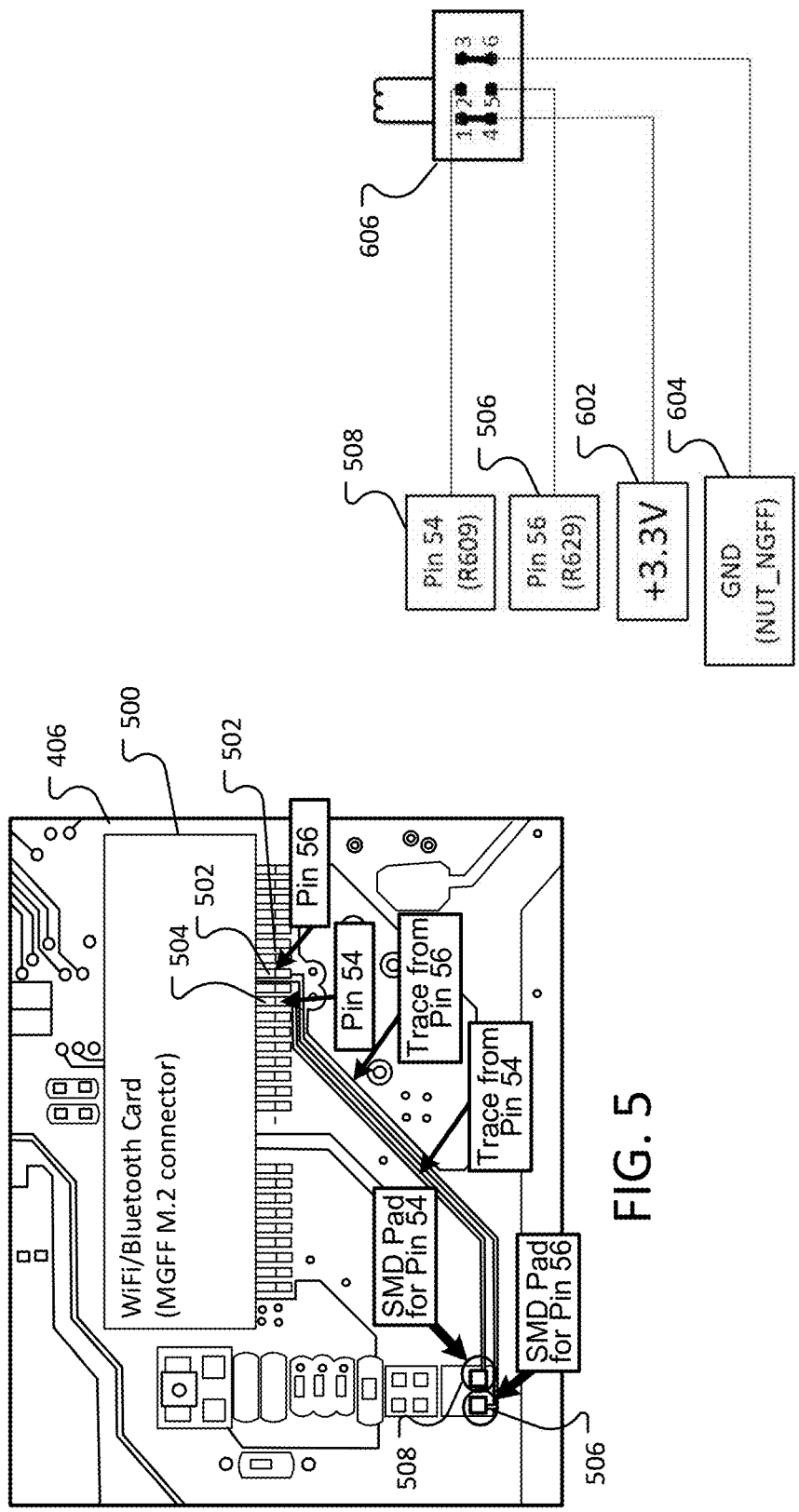
FIG. 5 illustrates an example of a WiFi/Bluetooth card that can be disabled using a switch.
FIG. 6 is a wiring diagram that illustrates and example of a switch connected to a Bluetooth card.

FIG. 5 illustrates an example of a WiFi/Bluetooth card 406 that can be disabled using a switch. In this example, the WiFi/Bluetooth card 406 uses a connector 500 (for example, a PCISIG M.2 NGFF connector). In this example, the connector 500 has 67 pins, each with a specific function. Some of the pins are used for data, some of the pins are used for power and ground, and still other pins are used for control signals. The two pins of interest are pin 502 (circuit board pin 56) and pin 504 (circuit board pin 54), which control PCISIG M.2 NGFF functions called W_DISABLE #1 and W_DISABLE #2 (respectfully). The switch enables and disables the WiFi/Bluetooth component by applying to pin 502 and pin 504 an input of one of two DC signals:

1. To turn the radios ON: Apply a Ground (GND) or +0 V signal.
2. To turn the radios OFF: Apply a +3.3 V signal.

In some scenarios, some of the smaller connector pins are inaccessible, either due to size or position. In some implementations, these smaller pins can be accessed through surface mounted devices. In this example, two Surface Mount Device (SMD) pads on the circuit board itself (in this example connector pin 502 can be accessed using pad 508 (Pad R609) and connector pin 504 can be accessed using pad 506 (Pad R629)).

FIG. 6 is a wiring diagram that illustrates and example of a switch 606 connected to the pad 508 and the pad 506. One side of the switch is wired to a +3.3 volt signal 602 and the other side of the switch 606 wired to ground 604. When the switch 606 is in the +3.3 Volt position, pins 504 and 502 in the M.2 NGFF connector will receive a HIGH voltage, and the radios on the WiFi card will be turned OFF. With the switch in the off position, pins 504 and 502 will receive a LOW voltage, and the WiFi and Bluetooth radios will be turned ON.

In some implementations, a switch can cause software configuration changes to be applied to the computing system. For example, the switch may enable software and/or hardware to use random MAC addresses when connecting to WiFi access points.

Some computer devices (e.g., laptops, desktop computers, tablets, smartphones, etc.) may be equipped with computer management technology. In general, computer management technology is integrated into the hardware and firmware. Computer management technology can enable the computing system to be controlled remotely, even when powered off. Examples of computer management technology include Intel's Active Management Technology (Intel AMT).

Because computer management technology relies on specific combinations of hardware, computer management technology can be avoided by selecting processors and components that are not compatible with the technology. For example, the computing system 100 can be configured be independent of infrastructure components on which computer management technology relies. For example, Intel AMT relies on an Intel network working card. In another example, the computing system 100 can be configured by removing or altering the software that controls the computer management technology.

Figure 7:
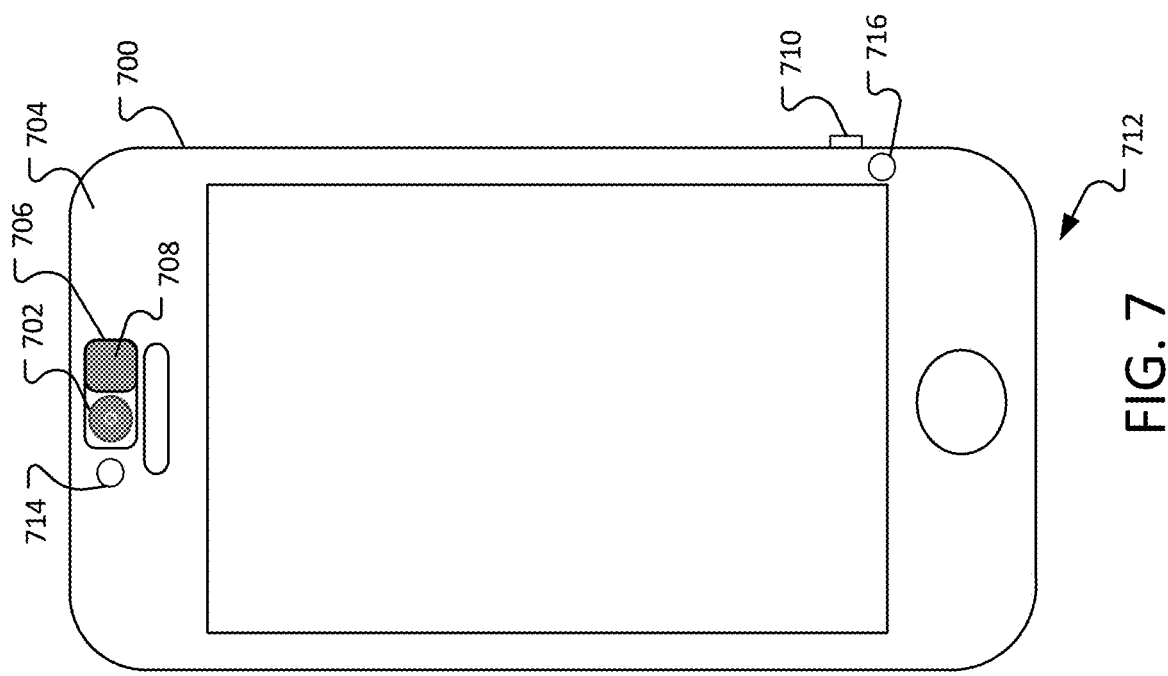
FIG. 7 illustrates an example of a smart phone with enhanced security.

FIG. 7 illustrates an example of a smart phone 700 with enhanced security. The smart phone 700 includes a frame 704. The smart phone 700 includes a camera 702 and a microphone 712 (not viewable in the figure as incorporated in the smart phone 700) coupled to the frame 704. The frame may be a structural part of the smart phone, for example, a front plastic cover (e.g., an exterior portion) that protects the electronics of the smart phone. A switch 706, connected to the frame, is positioned in proximity to the camera 702. Movement of the moveable portion 708 of the switch 706 from an on position to an off position causes the moveable portion 708 of the switch 706 covers the camera 702.

Users may wish to use the microphone 712 of the smart phone 700 without using the camera 702 (for example, the user may wish to place a telephone call). At the same time, use of the camera either uses the microphone (for example, to record a video), or does not use the microphone (for example, taking a digital photograph). To support these different usage, the smart phone 700 can include an additional switch 710, which can disable the microphone 712, independent of the camera 702. In some implementations, disabling the camera 702 also disables any additional cameras on the smart phone (not shown). An indicator 714 (such as an LED) is shown that is configured to signal to a user the status of the camera 702, microphone, and/or other sensors for the smart phone 700, similar to the indicator described previously in reference to the computing system 100. In some implementations, a second indicator 716 can be positioned near the additional switch 710 independent of the indicator 714.

Figure 8:
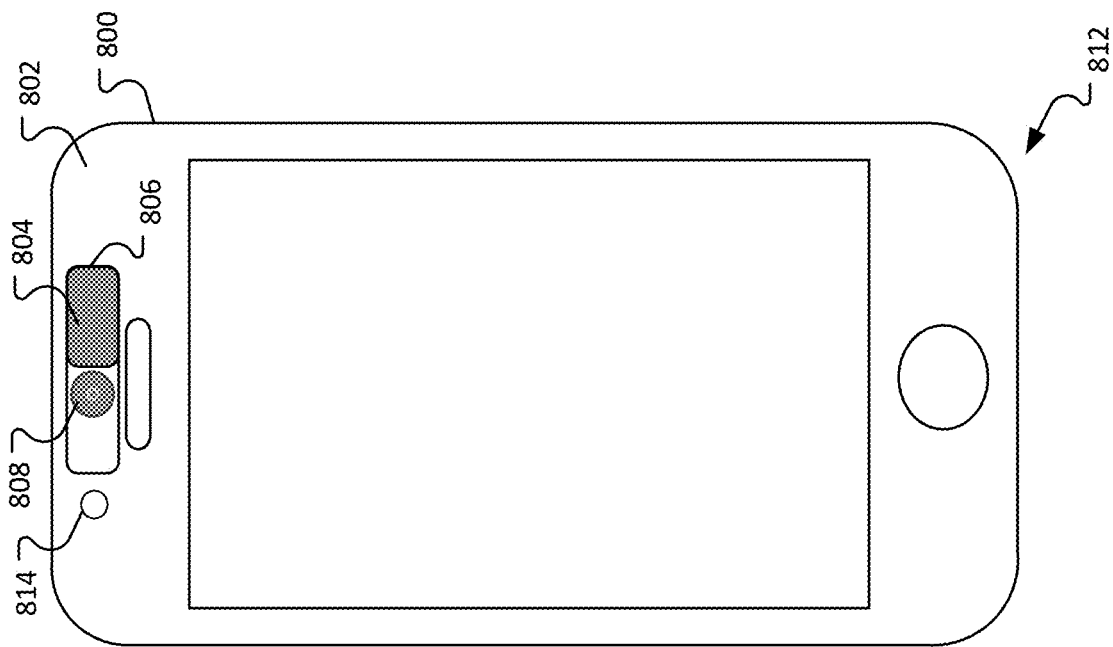
FIG. 8 illustrates another example of a smart phone with enhanced security.

FIG. 8 illustrates another example of a smart phone 800 with enhanced security. The smart phone 800 includes a frame 802. The smart phone 800 includes a camera 808 and a microphone 812 (not viewable in the figure, but incorporated into the smartphone 800) coupled to the frame 802. A double throw switch 806, connected to the frame, is positioned in proximity to the camera 808 so that movement of the moveable portion 804 of the double throw switch 806 from an a second on position to either a first on position or an off position causes the moveable portion 804 of the double throw switch 806 to cover the camera 808. An indicator 814 (such as an LED) is shown that is configured to signal to a user the status of the camera 808, microphone, and/or other sensors for the smart phone 800, similar to the indicator described previously in reference to the computing system 100.

In this example, a single switch 806 can be used to provide security to the user. As discussed above, a user may commonly wish to disable both the microphone and the camera (for example, while carrying the smartphone, access the microphone without accessing the camera (such as placing a telephone call), or access the microphone and the camera simultaneously (for example, while filming a video). While the user does not require the microphone while taking a digital photograph, the period of time that a photograph is being taken is relatively short, and enabling the microphone during that period may not pose a substantial security risk to the user.

In some implementations, movement of the switch from the on position to the partial-on position can disable the camera without disabling the microphone. Movement of the switch from the partial-on position to the off position can disable both the camera and the microphone. In some implementations, disabling the camera 808 also disables any additional cameras on the smart phone (for example, integrated into the back and front of the smart phone) (not shown).

In some implementations, when the switch is moved to the on position, a smart phone (for example, the smart phone 700 and smart phone 800) can recognize that a component has been enabled and can launch a default application associated with the component. For example, enabling the camera may cause the camera or photo taking application to launch.

Figure 9:
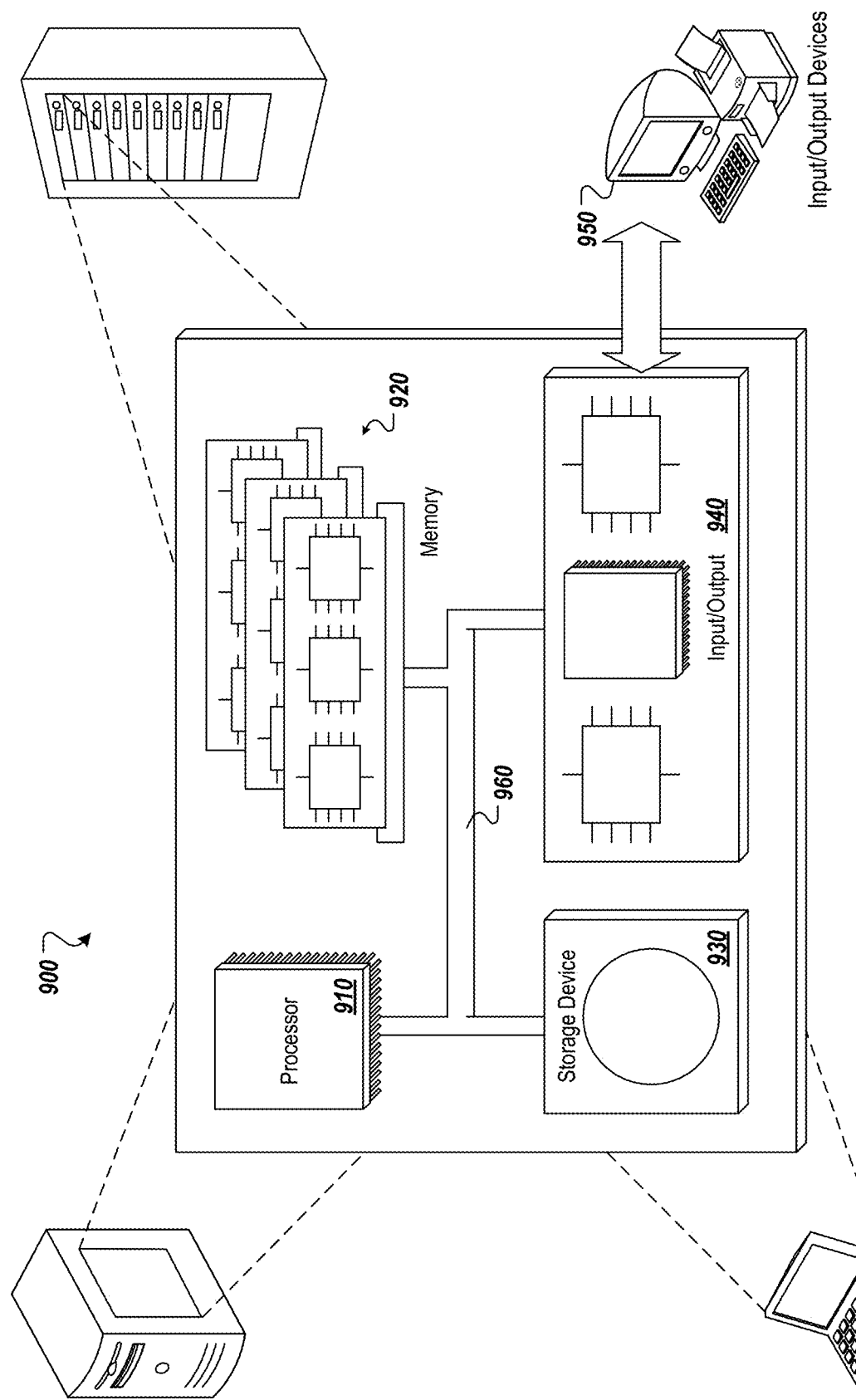
FIG. 9 depicts an example computing system, according to implementations of the present disclosure.

FIG. 9 depicts an example computing system, according to implementations of the present disclosure. The system 900 may be used for any of the operations described with respect to the various implementations discussed herein. For example, the system 900 may be included, at least in part, in one or more of the computing device(s) 106, the IoT device(s) 104, and/or other computing device(s) or system(s) described herein. The system 900 may include one or more processors 910, a memory 920, one or more storage devices 930, and one or more input/output (I/O) devices 950 controllable via one or more I/O interfaces 940. The various components 910, 920, 930, 940, or 950 may be interconnected via at least one system bus 960, which may enable the transfer of data between the various modules and components of the system 900.

The processor(s) 910 may be configured to process instructions for execution within the system 900. The processor(s) 910 may include single-threaded processor(s), multi-threaded processor(s), or both. The processor(s) 910 may be configured to process instructions stored in the memory 920 or on the storage device(s) 930. For example, the processor(s) 910 may execute instructions for the various software module(s) described herein. The processor(s) 910 may include hardware-based processor(s) each including one or more cores. The processor(s) 910 may include general purpose processor(s), special purpose processor(s), or both.

The memory 920 may store information within the system 900. In some implementations, the memory 920 includes one or more computer-readable media. The memory 920 may include any number of volatile memory units, any number of non-volatile memory units, or both volatile and non-volatile memory units. The memory 920 may include read-only memory, random access memory, or both. In some examples, the memory 920 may be employed as active or physical memory by one or more executing software modules.

The storage device(s) 930 may be configured to provide (e.g., persistent) mass storage for the system 900. In some implementations, the storage device(s) 930 may include one or more computer-readable media. For example, the storage device(s) 930 may include a floppy disk device, a hard disk device, an optical disk device, or a tape device. The storage device(s) 930 may include read-only memory, random access memory, or both. The storage device(s) 930 may include one or more of an internal hard drive, an external hard drive, or a removable drive.

One or both of the memory 920 or the storage device(s) 930 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 900. In some implementations, the CRSM may include a data store that provides storage of computer-readable instructions or other information in a non-transitory format. The CRSM may be incorporated into the system 900 or may be external with respect to the system 900. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 910 and the memory 920 may be supplemented by, or incorporated into, one or more application-specific integrated circuits (ASICs).

The system 900 may include one or more I/O devices 950. The I/O device(s) 950 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 950 may also include one or more output devices such as a display, LED(s), an audio output device (e.g., a speaker), a printer, a haptic output device, and so forth. The I/O device(s) 950 may be physically incorporated in one or more computing devices of the system 900, or may be external with respect to one or more computing devices of the system 900.

The system 900 may include one or more I/O interfaces 940 to enable components or modules of the system 900 to control, interface with, or otherwise communicate with the I/O device(s) 950. The I/O interface(s) 940 may enable information to be transferred in or out of the system 900, or between components of the system 900, through serial communication, parallel communication, or other types of communication. For example, the I/O interface(s) 940 may comply with a version of the RS-232 standard for serial ports, or with a version of the IEEE 1284 standard for parallel ports. As another example, the I/O interface(s) 940 may be configured to provide a connection over Universal Serial Bus (USB) or Ethernet. In some examples, the I/O interface(s) 940 may be configured to provide a serial connection that is compliant with a version of the IEEE 1394 standard.

The I/O interface(s) 940 may also include one or more network interfaces that enable communications between computing devices in the system 900, or between the system 900 and other network-connected computing systems. The network interface(s) may include one or more network interface controllers (NICs) or other types of transceiver devices configured to send and receive communications over one or more communication networks using any network protocol.

Computing devices of the system 900 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 900 may include any number of computing devices of any type. The computing device(s) may include, but are not limited to: a personal computer, a smart phone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Figure 10:
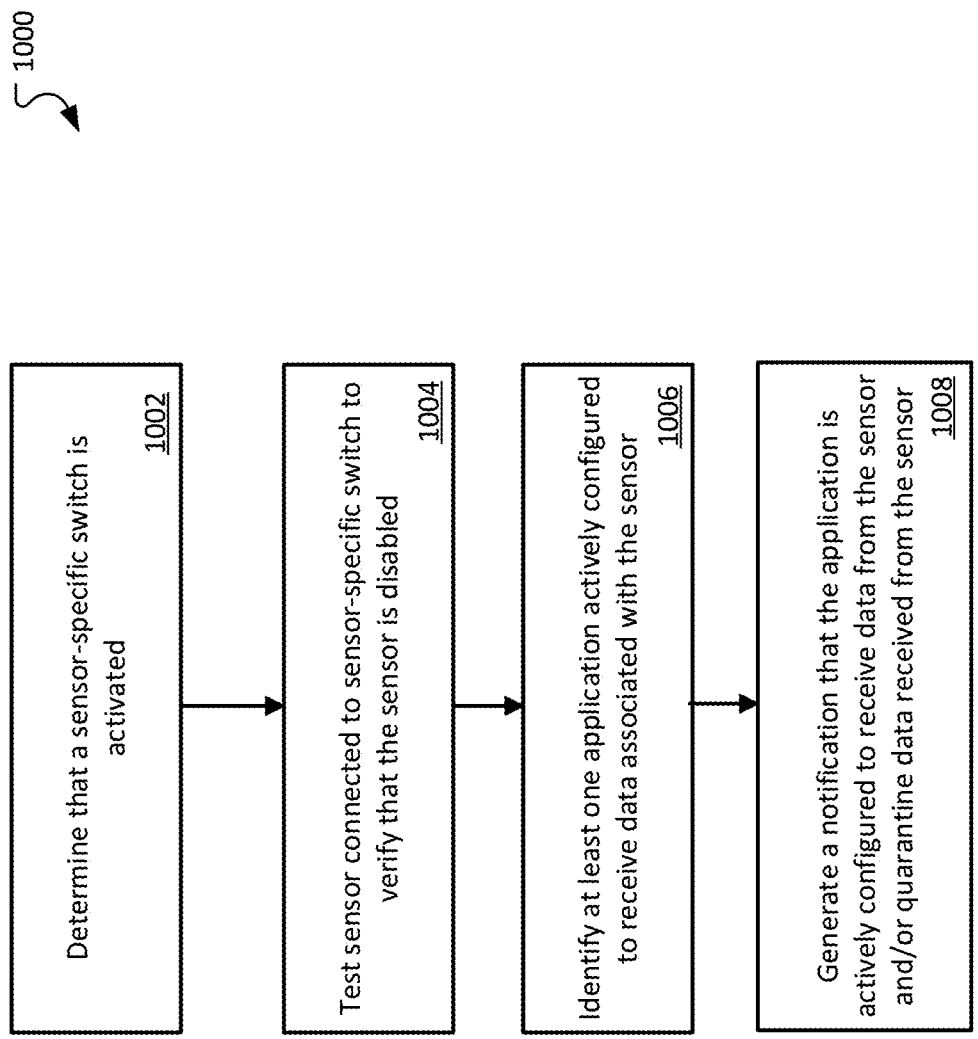
FIG. 10 includes a flow diagram showing a process for responding to a state change of a switch of a computing system

FIG. 10 includes a flow diagram showing a process 1000 for responding, by a computing device (such as a processing device of computing system 100 or smart phones 700, 800) to a state change of a switch (such as switch 112, 606, 706, 806, etc.) that is a part of the respective computing system including the computing device. The computing device of the computing system is configured to determine (1002) that a switch, which can include a sensor-specific switch connected to one or more sensors as previously described, is activated. The switch generally includes a hardware switch that is activated manually by a user of the computing system. The computing device is configured to test (1004) the sensor(s) connected to the switch to verify that the sensor(s) have been deactivated. Testing the sensors can include sending a test signal to the sensor(s) and waiting for a response, testing a voltage, and so forth. The test is performed to confirm that the switch has properly deactivated the sensor. If the sensor is still active, a notification can be generated to the user to inform the user that the sensor is still activated. The computing system is configured to identify (1006) any applications associated with the sensor that are actively configured (e.g., contemporaneously executing or recently executing) to use data from the sensor. For example, if a recording application is running, a notification can be generated informing the user that the recording application was reading microphone data when the switch was activated, which may alert the user to unauthorized access to the user's computing system. The computing device generates (1008) a notification for presentation to the user that identifies which application(s) were receiving data from the sensor that was deactivated. In some implementations, the computing device can quarantine the data (so that it cannot be transmitted to a remote device by a transmitter of the computing system), deactivate a network connection, delete the data, or take other remedial action to respond to a potential security threat.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system, comprising:
a frame;
a camera coupled to the frame, the camera comprising a lens;
a switch having an on position and an off position, the switch coupled to the frame wherein when the switch is in an off position a portion of the switch covers the lens and the camera is disabled and when the switch is in an on position the portion of switch does not cover the lens and the camera is enabled; and
a processing device configured to execute at least one application associated with the camera;
wherein, in response to detecting a change in a position of the switch, the processing device is configured to generate a notification that identifies the at least one application when the application is active.

2. The system of claim 1, further comprising:
a power source;
wherein when the switch is in the off position the camera is disconnected from the power source.

3. The system of claim 1, further comprising:
a microphone;
wherein when the switch is in the off position the microphone is disabled and when the switch is in the on position the microphone is enabled.

4. The system of claim 1, further comprising:
a hardware-based management processor;
wherein when the switch is in the off position the hardware-based management processor is disabled and when the switch is in the on position the hardware-based management processor is enabled.

5. The system of claim 1, wherein the system is a smart phone.

6. The system of claim 5, further comprising:
a second switch; and
a microphone;
wherein when the switch is in the off position the microphone is disabled and when the switch is in the on position the microphone is enabled.

7. The system of claim 1, further comprising:
a processing device;
a memory storing a default application associated with the camera;
wherein the processing device is configured to launch the default application in response to the switch being moved from the off position to the on position.

8. The system of claim 1, further comprising:
an indicator, wherein the indicator is connected to a power source of the camera, and wherein the indicator configured to emit a signal when the camera is enabled and wherein the indicator is configured to be disabled when the camera is disabled.

9. The system of claim 1, further comprising:
a processing device; and
a memory in communication with the processing device, the memory configured to store data that is generated by the camera or another sensor;
wherein the switch is configured to cause the processing device to quarantine the data that is generated by the camera or the other sensor in the memory when a position of the switch is changed.

10. The system of claim 1, further comprising:
a processing device; and
a memory in communication with the processing device, the memory configured to store data that is generated by the camera or another sensor;
wherein the switch is configured to cause the processing device to delete the data that is generated by the camera or the other sensor in the memory when a position of the switch is changed.

11. The system of claim 1, further comprising:
a processing device configured to execute at least one application associated with the camera;
wherein, in response to detecting a change in a position of the switch, the processing device is configured to generate a notification that halts execution of the at least one application.

12. The system of claim 1, further comprising:
a transmitter configured to send data to a remote computing device, wherein the switch is configured to temporarily disable the transmitter when the switch is moved to the off position.

13. A method for providing a physical security measure for a computing system, comprising:
determining, by a processing device of the computing system, that a hardware switch is moved to a position configured to disable a sensor of the computing system;
testing, by the processing device, the sensor to verify that the sensor is disabled; and
generating a notification for presentation on a user interface, the notification indicating that the sensor is disabled.

14. The method of claim 13, further comprising:
identifying, in response to determining that the hardware switch is moved to the position, at least one application configured to receive data associated with the sensor;
updating the notification to identify the at least one application configured to receive data from the sensor when the application is active at a time when the hardware switch is moved.

15. The method of claim 13, further comprising:
determining that data is generated by the sensor during a time window, the time window having a pre-determined length;
causing the data generated by the sensor during the time window to be deleted in response to determining that the hardware switch is moved to the position.

16. The method of claim 13, further comprising:
deactivating a second, different sensor in response to determining that the hardware switch is moved.

17. The method of claim 13, wherein the sensor comprises one of a camera, a microphone, and a transmitter.

18. The method of claim 13, further comprising:
causing a hardware-based management processor to be disabled in response to determining that the hardware switch is moved to the position.

19. A smart phone device comprising enhanced security for operation of sensors of the smart phone, the smart phone comprising:

a frame forming an exterior portion of the smart phone;
a camera coupled to the frame, the camera having a lens;
a switch that is coupled to the frame, wherein when the switch is in an off position, a portion of the switch covers the lens and the camera is disabled, and when the switch is in an on position, the portion of switch does not cover the lens and the camera is enabled, wherein the switch is configured to slide in front of the lens of the camera when moved between the on position and the off position; and
a processing device configured to execute at least one application associated with the camera;
wherein, in response to detecting a change in a position of the switch, the processing device is configured to generate a notification that identifies the at least one application when the application is active.

20. A system, comprising:
a frame;
a camera coupled to the frame, the camera comprising a lens;
a switch having an on position and an off position, the switch coupled to the frame wherein when the switch is in an off position a portion of the switch covers the lens and the camera is disabled and when the switch is in an on position the portion of switch does not cover the lens and the camera is enabled;
a processing device; and
a memory in communication with the processing device, the memory configured to store data that is generated by the camera or another sensor;
wherein the switch is configured to cause the processing device to quarantine the data that is generated by the camera or the other sensor in the memory when a position of the switch is changed.

21. A system, comprising:
a frame;
a camera coupled to the frame, the camera comprising a lens;
a switch having an on position and an off position, the switch coupled to the frame wherein when the switch is in an off position a portion of the switch covers the lens and the camera is disabled and when the switch is in an on position the portion of switch does not cover the lens and the camera is enabled;
a processing device; and
a memory in communication with the processing device, the memory configured to store data that is generated by the camera or another sensor;
wherein the switch is configured to cause the processing device to delete the data that is generated by the camera or the other sensor in the memory when a position of the switch is changed.

22. A system, comprising:
a frame;
a camera coupled to the frame, the camera comprising a lens;
a switch having an on position and an off position, the switch coupled to the frame wherein when the switch is in an off position a portion of the switch covers the lens and the camera is disabled and when the switch is in an on position the portion of switch does not cover the lens and the camera is enabled; and
a processing device configured to execute at least one application associated with the camera;

wherein, in response to detecting a change in a position of the switch, the processing device is configured to generate a notification that halts execution of the at least one application.

* * * * *